(12) United States Patent
You et al.

(10) Patent No.: US 10,287,208 B2
(45) Date of Patent: May 14, 2019

(54) FUNCTIONAL BUILDING MATERIAL FOR WINDOWS AND DOORS

(71) Applicant: LG HAUSYS, LTD., Seoul (KR)

(72) Inventors: Hyun-Woo You, Incheon (KR);
Youn-Ki Jun, Gwacheon-si (KR);
Dae-Hoon Kwon, Anyang-si (KR);
Sung-Jin Park, Incheon (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/758,625

(22) PCT Filed: Sep. 8, 2016

(86) PCT No.: PCT/KR2016/010100
§ 371 (c)(1),
(2) Date: Mar. 8, 2018

(87) PCT Pub. No.: WO2017/047983
PCT Pub. Date: Mar. 23, 2017

(65) Prior Publication Data
US 2018/0244568 A1 Aug. 30, 2018

(30) Foreign Application Priority Data
Sep. 14, 2015 (KR) .................. 10-2015-0129698

(51) Int. Cl.
*C03C 17/36* (2006.01)
*B32B 17/06* (2006.01)
*E06B 9/24* (2006.01)

(52) U.S. Cl.
CPC ............ *C03C 17/366* (2013.01); *B32B 17/06* (2013.01); *C03C 17/3615* (2013.01);
(Continued)

(58) Field of Classification Search
USPC .................. 428/426, 428, 432, 434, 688
See application file for complete search history.

(56) References Cited

U.S. PATENT DOCUMENTS

| 6,602,608 B2 * | 8/2003 | Stachowiak | C03C 17/36 428/428 |
| 2011/0261442 A1 * | 10/2011 | Knoll | C03C 17/36 359/360 |

(Continued)

FOREIGN PATENT DOCUMENTS

| JP | 2004352567 A | 12/2004 |
| JP | 2016041651 A | 3/2016 |

(Continued)

OTHER PUBLICATIONS

International Search Report for PCT/KR2016/010100 dated Jan. 6, 2017.
(Continued)

*Primary Examiner* — Lauren R Colgan
(74) *Attorney, Agent, or Firm* — Hauptman Ham, LLP

(57) ABSTRACT

Provided is a functional building material for windows and doors, which is a multi-layered structure including: a transparent glass substrate; and a low emissivity coating formed on a surface of the transparent glass substrate, wherein the low emissivity coating includes a lowermost barrier layer, a dielectric layer, a low emissivity protective layer, a low emissivity layer, and an uppermost protective layer, wherein the lowermost barrier layer is located at the lowermost portion of the low emissivity coating to contact the transparent glass substrate, and the uppermost protective layer is located at the uppermost portion at which the low emissivity coating is outwardly exposed, wherein the lowermost barrier layer is multi-layered to include a first layer contacting the transparent glass substrate and a second layer located on the upper part of the first layer.

14 Claims, 2 Drawing Sheets

(52) U.S. Cl.
CPC ...... *C03C 17/3626* (2013.01); *C03C 17/3639* (2013.01); *C03C 17/3644* (2013.01); *C03C 17/3649* (2013.01); *C03C 17/3652* (2013.01); *E06B 9/24* (2013.01); *C03C 2218/155* (2013.01); *C03C 2218/156* (2013.01); *E06B 2009/2417* (2013.01)

(56) References Cited

U.S. PATENT DOCUMENTS

| 2012/0087005 | A1* | 4/2012 | Reymond | C03C 17/36 359/360 |
|---|---|---|---|---|
| 2014/0072784 | A1* | 3/2014 | Dietrich | B32B 5/00 428/213 |
| 2014/0186598 | A1 | 7/2014 | Ding et al. | |

FOREIGN PATENT DOCUMENTS

| JP | 2016160142 A | 9/2016 |
|---|---|---|
| KR | 1019970000383 B1 | 1/1997 |
| KR | 10-2003-0076569 A | 9/2003 |
| KR | 2011/037365 A2 | 3/2011 |
| KR | 1020110033769 A | 3/2011 |
| KR | 10-2013-0020029 A | 2/2013 |
| KR | 10-2014-0082153 A | 7/2014 |
| KR | 1020150051314 A | 5/2015 |
| KR | 1020150069533 A | 6/2015 |
| KR | 10-2016-0010332 A | 1/2016 |

OTHER PUBLICATIONS

The extended European search report dated Sep. 7, 2018 in connection with the counterpart European Patent Application No. 16846804.9.
Korean Office Action dated Jun. 21, 2018 in connection with the counterpart Korean Patent Application No. 10-2015-0129698.
Korean Office Action issued on Nov. 21, 2018, in connection with the Korean Patent Application No. 10-2015-0129698 citing the above reference(s).

* cited by examiner

FUNCTIONAL BUILDING MATERIAL FOR WINDOWS AND DOORS

CROSS REFERENCE TO RELATED APPLICATION

This present application is a national stage filing under 35 U.S.C § 371 of PCT application number PCT/KR2016/010100 filed on Sep. 8, 2016 which is based upon and claims the benefit of priority to Korean Patent Application No. 10-2015-0129698 filed on Sep. 14, 2015, in the Korean Intellectual Property Office. The disclosures of the above-listed applications are hereby incorporated by reference herein in their entirety.

TECHNICAL FIELD

The present invention relates to a functional building material for windows and doors.

BACKGROUND ART

A Low-Emissivity glass refers to a glass in which a low emissivity layer containing a highly reflective metal in an infrared light region such as silver (Ag) is deposited as a thin film. Such a Low-Emissivity glass is a functional material having an energy saving effect of the buildings by reflecting a radiant light in the infrared light region to block an outdoor solar radiant heat in summer and to preserve an indoor heating radiant heat in winter.

Generally, since silver (Ag) used as the low emissivity layer is oxidized when being exposed in the air, an dielectric layer is deposited as an oxidation prevention layer on an upper part and a lower part of the low emissivity layer. Such a dielectric layer also functions to increase a visible light transmittance.

DISCLOSURE

Technical Problem

An exemplary embodiment of the present invention provides the functional building material for windows and doors improved with a heat resistance, a moisture resistance and an abrasion resistance.

Technical Solution

In an exemplary embodiment of the present invention, a functional building material for windows and doors is provided, which is a multi-layered structure including:

a transparent glass substrate; and a low emissivity coating formed on a surface of the transparent glass substrate, wherein the low emissivity coating includes a lowermost barrier layer, a dielectric layer, a low emissivity protective layer, a low emissivity layer, and an uppermost protective layer, wherein the lowermost barrier layer is located at the lowermost portion of the low emissivity coating to contact the transparent glass substrate, and the uppermost protective layer is located at the uppermost portion at which the low emissivity coating is outwardly exposed, wherein the lowermost barrier layer is multi-layered to include a first layer contacting the transparent glass substrate and a second layer located on the upper portion of the first layer, wherein the first layer includes a metal or a composite metal, and wherein the second layer includes one selected from the group consisting of a metal oxide, a metal nitride, a metal oxynitride, a composite metal oxide, a composite metal nitride, a composite metal oxynitride, and a combination thereof.

The metal is Si, Zr or Ti and the composite metal may be SiAl, ZrSi or TiZr.

The second layer may include one selected from the group consisting of silicon oxide, silicon aluminum oxide, zirconium oxide, zirconium silicon oxide, titanium oxide, titanium zirconium oxide, silicon oxynitride, silicon aluminum oxynitride, zirconium oxynitride, zirconium silicon oxynitride, titanium oxynitride, titanium zirconium oxynitride, and a combination thereof.

The lowermost barrier layer, additionally, may further include an additional metal layer including the metal of Si, Zr of Ti; the composite metal of SiAl, ZrSi or TiZr; or an additional metal compound layer including one selected from the group consisting of silicon oxide, silicon aluminum oxide, zirconium oxide, zirconium silicon oxide, titanium oxide, titanium zirconium oxide, silicon oxynitride, silicon aluminum oxynitride, zirconium oxynitride, zirconium silicon oxynitride, titanium oxynitride, titanium zirconium oxynitride, and a combination thereof.

Advantageous Effects

The functional building material for windows and doors is excellent in the heat resistance, the moisture resistance, and the abrasion resistance.

BEST MODE

Figure 1:
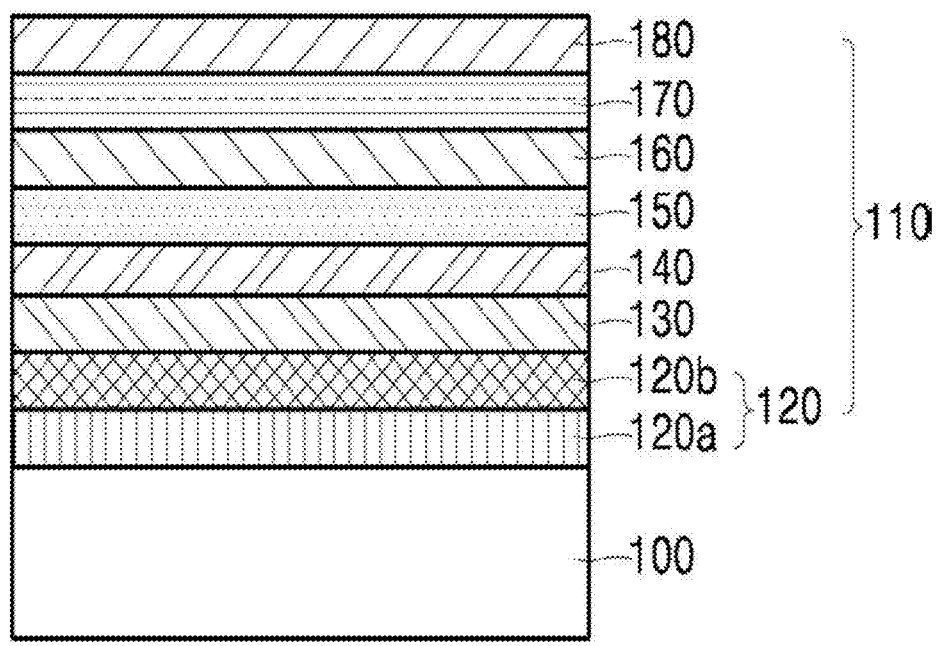
FIG. 1 is a schematic cross-sectional view illustrating the functional building material for windows and doors in accordance with an exemplary embodiment of the present invention.

Hereinafter, the embodiments of the present invention will be described in detail with reference to the accompanying drawings so that those skilled in the art to which the present invention pertains may easily perform the present invention. The present invention may be implemented in many different forms and is not limited to the embodiment described herein.

The parts which are not related to the description are omitted in order to clearly describe the present invention and the same or similar components are designated by the same reference numerals throughout the specification.

In the drawings, a thickness is shown as enlarged to clearly describe many layers and regions. In the drawings, for the convenience of explanation, the thickness of the partial layers and regions is shown as exaggerated.

Hereinafter, any configuration is formed in "the upper part (or the lower part)" of a substrate, or "on (or below)" of the substrate means that any configuration is formed by contacting an upper surface (or a lower surface) of the substrate, and is not limited to not including other configuration between the substrate and any configuration formed on (or below) the substrate.

In an exemplary embodiment of the present invention, there is provided the functional building material for windows and doors 10 including a transparent glass substrate 100 and the low emissivity coating (coat) 110 formed on a surface of the transparent glass substrate 100.

The low emissivity coating 110 includes a lowermost barrier layer 120, a dielectric layer 130, 170, a low emissivity protective layer 140, 160, a low emissivity layer 150, and an uppermost protective layer 180, the lowermost barrier layer 120 is located at the lowermost portion of the low emissivity coating 110 to contact the transparent glass substrate 100, and the uppermost protective layer 180 is located at the uppermost portion at which the low emissivity coating 110 is outwardly exposed.

The lowermost barrier layer 120 is a multi-layered structure including the first layer 120a contacting the transparent glass substrate 120 and the second layer 120 located on the upper part of the first layer 120a.

The first layer 120a includes the metal or the composite metal, and the second layer 120b includes one selected from the group consisting of a metal oxide, a metal nitride, a metal oxynitride, a composite metal oxide, a composite metal nitride, a composite metal oxynitride, and a combination thereof.

FIG. 1 is a cross-sectional view illustrating the functional building material for windows and doors 10 in accordance with another embodiment of the present invention. The functional building material for windows and doors 10 is the structure which the transparent glass substrate 100, the lowermost barrier layer, the dielectric layer 130, 170, the low emissivity protective layer 140, 160, the low emissivity layer 150, the low emissivity protective layer 140, 160, the dielectric layer 130, 170, and the uppermost protective layer 180 are sequentially stacked from the bottom.

The low emissivity coating 110 may be formed such as FIG. 1 as a multi-layered thin film structure on the basis of a low emissivity layer 150 selectively reflecting a far-infrared light among the solar radiant light, and reduces the emissivity to provide the low emissivity coating 110 with an excellent insulation performance by a Low-e: low emissivity effect.

The low emissivity coating 110 is the functional material having an energy saving effect of the buildings, which is formed as the structure as the above, for example, when being applied as a coating film of a window glass, it reflects the outdoor solar radiant heat in summer and preserves the indoor heating radiant heat in winter to minimize a heat transfer between indoor and outdoor.

'Emissivity' refers to a ratio which an object absorbs, transmits, and reflects the energy having any certain wavelength. That is, the emissivity in the present specification refers to an degree of absorption of an infrared light energy in an infrared light wavelength region, and specifically, means a ratio of the infrared light energy to be absorbed with regard to the infrared light energy to be applied when the far-infrared light corresponding to a wavelength region of about 5 μm to about 50 μm showing a strong heat action is applied.

According to Kirchhoff's theory, the infrared light energy absorbed to an object is same as the infrared light energy emitted by the object again, such that an absorption rate and the emissivity of the object are same.

In addition, since the infrared light energy that is not absorbed is reflected from a surface of the object, the higher reflectance to the infrared light energy of the object, the lower emissivity. Upon expressing it numerically, it has a relation of (emissivity=1-the reflectance of the infrared light).

Such an emissivity may be measured by various methods generally known in the art, for example, may be measured by the equipments such as Fourier transform infrared spectroscope (FT-IR), etc., according to KSL2514 standard.

The absorption rate with regard to the far-infrared light representing the strong heat action, of any objects, for example, the low-emissivity glass, etc., i.e., emissivity may represent a significantly important meaning in measuring the insulation performance.

The low emissivity coating 110 is applied as the coating film to the transparent glass substrate 100 to embody the energy saving type of functional building material for windows and doors, which can implement an excellent lighting property by maintaining a predetermined transmission property in a visible light region and provide an excellent insulation effect by lowering the emissivity in the infrared light region. Such functional building material for windows and doors is also referred to as so-called 'Low-e glass'.

The low emissivity layer 150 is a layer made of an electrically conductive material having a low emissivity, for example, a metal, that is, has a low sheet resistance, and accordingly, the low emissivity. For example, the low emissivity layer 150 may have an emissivity of about 0.01 to about 0.3, specifically, about 0.01 to about 0.2, more specifically, about 0.01 to about 0.1, and still more specifically, about 0.01 to about 0.08.

The low emissivity layer 150 in the above emissivity range may simultaneously implement the excellent insulation effect and the lighting property by appropriately controlling the visible light transmittance and the infrared light emissivity. In the low emissivity layer 150 having the above emissivity, the sheet resistance of a material made of the thin film may be, for example, about 0.78 Ω/sq to about 6.42 Ω/sq, and is not limited thereto.

The low emissivity layer 150 functions to selectively transmit and reflect the solar radiant light, and specifically, has a low emissivity since the reflectance for the radiant light in the infrared light region is high. The low emissivity layer 150 may include at least one selected from the group consisting of Ag, Au, Cu, Al, Pt, ion doped metal oxide, and a combination thereof, and is not limited thereto, and the metal known that is capable of implementing a low reflection performance may be used without limitation. Ion doped metal oxide includes, for example, indium tin oxide (ITO), fluorine doped tin oxide (FTO), Al doped zinc oxide (AZO), gallium zinc oxide (GZO), etc. In an exemplary embodiment, the low emissivity layer 150 may be a layer made of silver (Ag), and as a result, the low emissivity coating 110 may implement a high electrical conductivity, a low absorption rate in the visible light region, and a durability, etc.

The thickness of the low emissivity layer 150 may be, for example, about 5 nm to about 25 nm. The low-emissivity layer 150 having the above range of thickness is suitable for simultaneously implementing the low infrared light emissivity and high transmittance of the visible light.

The low emissivity protective layer 140, 160 is made of the metal having the excellent light absorption performance to function to control the solar light, and can control a color that the low emissivity coating 110 implements by adjusting the materials and the thickness thereof.

In an exemplary embodiment, the low emissivity protective layer 140, 160 may have an extinction coefficient in the visible light region of about 1.5 to about 3.5. The extinction coefficient is a value deduced from an optical constant, which is an unique property of the material and the optical constant is marked as a formula of n-ik. In this case, a real number part n is a refractive index, and an imaginary number part k is referred to as the extinction coefficient (also referred to as an absorption coefficient, a light-absorbing coefficient, a light-extinction coefficient, etc.). The extinction coefficient is the function of a wavelength $\lambda$, and in case of the metal, it is general that the extinction coefficient is greater than 0. The extinction coefficient k has a relationship of $\alpha=(4\pi k)/\lambda$, with $\alpha$, which is the absorption coefficient, and, when the thickness of a medium through which the light passes is d, with regard to the absorption coefficient $\alpha$, an intensity of the light I due to the absorption of the light by the medium is decreased compared to the intensity of an incident light IO, with a relationship of $I=I0 \exp(-\alpha d)$.

The low emissivity protective layer 140, 160 absorbs some portions of the visible light by using the metal having the extinction coefficient in the visible light region in the above range so that the low emissivity coating 110 has a predetermined color.

For example, the low emissivity protective layer 140, 160 may include at least one selected from the group consisting of Ni, Cr, and alloy of Ni and Cr, and a combination thereof, and is not limited thereto.

The low emissivity protective layer 140, 160 may be included of a single layer or a plurality of layers and may be located at a surface or both surfaces of the low emissivity layer 150. FIG. 1 shows a case that the low emissivity protective layer 140, 160 is formed on both surfaces of the low emissivity layer 150 as the plurality of layers.

The thickness of the low emissivity protective layer 140, 160 may be, for example, about 0.5 nm to about 5 nm, and is not limited thereto, and may vary appropriately depending on use. With the above thickness range, the low emissivity coating 110 is suitable for being controlled to have a predetermined transmittance and the reflectance while functioning as the low emissivity protective layer 140, 160.

The dielectric layer 130, 170 may act as the oxidation prevention layer of the low emissivity layer 150 since the metal used as the low emissivity layer 150 is likely to be oxidized, and also, the dielectric layer 130, 170 also functions to increase the visible light transmittance. In addition, an optical performance of the low emissivity coating 110 may be controlled by appropriately controlling the materials and the properties of the dielectric layer 130, 170.

The dielectric layer 130, 170 may be included of a single layer or a plurality of layers, depending on a predetermined use, or in accordance with the properties to be implemented. In FIG. 1, it shows the structure that the dielectric layers 130, 170, as a plurality of layers are included and the low emissivity coating 140, 160 and the dielectric layer 130, 170 are sequentially formed on both surfaces to form a symmetric structure.

The dielectric layer 130, 170 may include the various metal oxide, the metal nitride, etc., and is not limited thereto, and the known material which is used to protect the low emissivity layer 150 may be used without limitation.

For example, the dielectric layer 130, 170 may include at least one selected from the group consisting of titanium oxide, tin zinc oxide, zinc oxide, zinc aluminum oxide, tin oxide, bismuth oxide, silicon nitride, silicon aluminum nitride, silicon tin nitride, etc., and a combination thereof, and is not limited thereto. At least one element selected from the group consisting of bismuth (Bi), boron (B), aluminum (Al), silicon (Si), magnesium (Mg), antimony (Sb), beryllium (Be), and a combination thereof may be doped to such a metal oxide and/or a metal nitride and, as a result, thereby contributing to an improvement of the durability.

The dielectric layer 130, 170 may consist of the dielectric material having a refractive index between about 1.5 to about 2.3 and the thickness of the dielectric layer 130, 170 may be controlled so that the transmittance, the reflectance, and transmitted and reflected color, etc. are implemented to a desired target level according to the value of the refractive index.

The thickness of the dielectric layer 130, 170 may be, for example, about 5 nm to about 60 nm. The thickness of the dielectric layer 130, 170 may be controlled in various ways according to the materials formed with and a location formed in, to implement the optical performance of the total multi-layered thin film (the transmittance, the reflectance, and a color index) in accordance with a target performance. The optical performance can be effectively controlled by the dielectric layer 130, 170 including the dielectric layer 130, 170 having the thickness in the above range, and a suitable manufacturing speed may be implemented.

The dielectric layer 130, 170 may be made of the materials having a light extinction coefficient close to 0. Having the extinction coefficient greater than 0 means that the incident light is absorbed at the dielectric layer 130, 170, before reaching the low emissivity layer 150, and thus, it is a inhibiting factor for securing a transparent sight, which is not preferable. Thus, the extinction coefficient of the dielectric layer 130, 170 may have, for example, about less than 0.1 in the visible light region (a wavelength range of about 380 nm to about 780 nm). As a result, the dielectric layer 130, 170 may contribute to securing the transparent sight by accomplishing the excellent lighting property.

The lowermost barrier layer 120 is the layer for the purpose of a protection from the heat in a heat treatment process accompanied during a manufacturing process of the functional building material for windows and doors, the protection from the hot and humid environment while subjecting to the hot and humid ambient environment, or the protection against a physical damage in transportation or handling.

In more detailed description, specifically, the heat treatment process is performed, which applies a pre-stress through a bending or a strengthening process, during the manufacturing process of the functional building material for windows and doors of forming the low emissivity coating 110 on a surface of the transparent glass substrate 100. Such heat treatment process is heated to a temperature of about 600~700° C., and, during the application of such heat, the material forming the low emissivity coating 100 is subjected to a structural deformation as an oxidation, a diffusion, or a lumping, etc. are often induced. On the other hand, as the low emissivity coating 110 encounters the hot and humid environment, and contacts a corrosive agent such as oxygen, or chloride, sulfide, and sulfur dioxide, etc., in the air, there exists a problem that a corrosion of the low emissivity coating 110 is generated and the coating film is damaged.

As such, the need is provided for the functional building material for windows and doors to be protected from the heat treatment process, from the hot and humid ambient environment, or from the physical damage in handling. The functional building material for windows and doors includes the lowermost barrier layer 120 to prevent the physical and chemical diffusion of an alkali ion and oxygen from the transparent glass substrate 100 in the lower part, and accordingly, acts to protect the low emissivity coating 110 from the afore-mentioned heat treatment process and the hot and humid ambient environment, and also, the lowermost barrier layer 120 improves an interfacial adhesive force of the glass substrate and the low emissivity coating 110, thereby improving the abrasion resistance of the low emissivity coating 110.

Accordingly, the functional building material for windows and doors including the lowermost barrier layer 120 is excellent in the heat resistance, the moisture resistance, and the abrasion resistance.

The lowermost barrier layer 120 is specifically formed of a plurality of layers and with the multi-layered structure including at least the first layer 120a and the second layer 120b, to achieve the purpose of the protection of the low emissivity coating 110.

The first layer 120a includes the metal or the composite metal, and more specifically, the metal may be Si, Zr or Ti, and the composite metal may be SiAl, ZrSi or TiZr.

The composite metal refers to the alloy, for example, SiAl may be alloy of Si and Al.

The second layer 120b may include one selected from the group consisting of the metal oxide, the metal nitride, the metal oxynitride, the composite metal oxide, the composite metal nitride, the composite metal oxynitride, and a combination thereof, and more specifically, one selected from the group consisting of silicon oxide, silicon aluminum oxide, zirconium oxide, zirconium silicon oxide, titanium oxide, titanium zirconium oxide, silicon oxynitride, silicon aluminum oxynitride, zirconium oxynitride, zirconium silicon oxynitride, titanium oxynitride, titanium zirconium oxynitride, and a combination thereof.

The first layer 120a is formed of the metal or the composite metal, thereby largely contributing to the prevention of the diffusion of the alkali ion and the oxygen from the transparent glass substrate 100 and the second layer 120b is formed of oxide, oxynitride, and nitride of the metal or the composite metal, thereby largely contributing to the improvement of the interfacial adhesive force of the transparent glass substrate 100 and the low emissivity coating 110.

The first layer 120a and the second layer 120b may be formed with the suitable thickness in accordance with each use. For example, the first layer 120a may be formed in the thickness of about 0.5 nm to about 5 nm and the second layer 120b may be formed in the thickness of about 0.5 nm to about 50 nm.

The lowermost barrier layer 120 may form the multi-layered structure to further include an additional layer, in addition to the first layer 120a and the second layer 120b. That is, the lowermost barrier layer 120, additionally, may further include the additional metal layer including the metal of Si, Zr or Ti; the composite metal of SiAl, ZrSi or TiZr, or the additional metal compound layer including one selected from the group consisting of silicon oxide, silicon aluminum oxide, zirconium oxide, zirconium silicon oxide, titanium oxide, titanium zirconium oxide, silicon oxynitride, silicon aluminum oxynitride, zirconium oxynitride, zirconium silicon oxynitride, titanium oxynitride, titanium zirconium oxynitride, and a combination thereof.

The low emissivity coating 110 may further include the other additional layer other than the aforementioned structure to implement a predetermined optical performance.

The transparent glass substrate 100 may be a transparent substrate having a high transmittance of the visible light, and may be, for example, the glass or a transparent plastic substrate having the visible light transmittance of about 80% to about 100%. The transparent glass substrate 100, for example, the glass used for construction may be used without limitation, and for example, may have a thickness of about 2 mm to about 12 mm, and may vary depending on use purposes and functions, and is not limited thereto.

In order to manufacture the functional building material for windows and doors, first, after preparing the transparent glass substrate 100, each layer of the low emissivity coating 110 may be sequentially formed. Each layer of the low emissivity coating 110 may be formed by the method suitable for implementing a desired property, according to the known method.

For example, the first layer 120a and the second layer 120b of the low emissivity layer 150, the low emissivity protective layer 140, 160 and the lowermost barrier layer 120 may be formed according to the method of a sputtering, etc.

Hereinafter, Examples and Comparative Examples of the present invention will be described. Such following Examples is merely an exemplary embodiment of the present invention, and the present invention is not limited to the following Examples.

EXAMPLE

Example 1

The low emissivity coating having the multi-layered structure coated on the transparent glass substrate was manufactured as described below by using a Magnetron sputtering deposition device (Selcos Cetus-S).

Zr metal layer having a thickness of 1 nm was deposited and formed on the transparent glass substrate having a thickness of 6 mm and below the lower surface of the low emissivity layer under an argon atmosphere and ZrOx metal oxide layer having a thickness of 3 nm was deposited on the upper surface of the metal layer under an argon/oxygen (10 vol % of argon, 90 vol % of oxygen) atmosphere so as to form the lowermost barrier layer.

Silicon aluminum nitride having a thickness of 50 nm was deposited under the argon/nitrogen (80 vol % of argon, 20 vol % of nitrogen) atmosphere, and then, NiCr having a thickness of 1 nm was deposited under 100% of the argon atmosphere to form a low emissivity protective layer.

Then, the low emissivity layer was formed by depositing Ag having the thickness of 7 nm and the low reflective protective layer was formed on the upper surface of the low emissivity layer under the argon atmosphere by depositing NiCr with the thickness of 1 nm.

Subsequently, silicon aluminum nitride was deposited under the argon/nitrogen (80 vol % of argon, 20 vol % of oxygen) atmosphere to form the dielectric layer having the thickness of 45 nm.

Comparative Example 1

The functional building material for windows and doors was manufactured by the same method as Example 1, except that the lowermost barrier layer was not formed in Example 1.

Evaluation

Experimental Example 1: Evaluation of Heat Resistance

For the functional building material for windows and doors manufactured according to Example 1 and Comparative Example 1, with an interior temperature of the equipment maintained at about 700° C., by using a box furnace equipment for experiments, a sample was put in and maintained for 5 minutes and taken out. After a heat treatment, the degree of defect was observed by using the optical microscope (×200).

Figure 2:
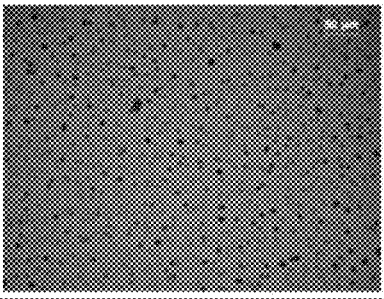
FIG. 2 is an optical microscope image under a specific condition for the heat resistance evaluation with regard to the functional building material for windows and doors manufactured in Example and Comparative Example.

FIG. 2 is an image observed by the optical microscope after the heat treatment of the low emissivity coating film of Example 1 and Comparative Example 1. From the above, the degree of defect was evaluated.

The number of defect was counted in FIG. 2 and described in Table 1 below.

TABLE 1

|  | Classification ||
| --- | --- | --- |
|  | Example 1 | Comparative Example 1 |
| Number of defect | 0 | 200 or more |

As shown in FIG. 2, it was confirmed that the degree of defect was largely shown in Comparative Example 1. On the other hand, it was understood that the degree of defect was shown low as the structural deformation of the low emissivity coating is generated low in Example 1, and, it was confirmed that a thermal property was excellent compared to Comparative Example 1.

Experimental Example 2: Evaluation of Moisture Resistance

Figure 3:
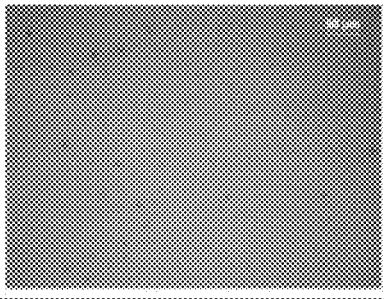
FIG. 3 is an optical microscope image under a specific condition for the moisture resistance evaluation with regard to the functional building material for windows and doors manufactured in Example and Comparative Example.

A moisture resistance evaluation (Day 3) was performed under the conditions of 50° C., 90% RH (humidity), by using a constant temperature and humidity chamber (LS Co., Ltd., EBS-35B), with regard to the functional building material for windows and doors manufactured according to Example 1 and Comparative Example 1, and the degree of corrosion was observed by using the optical microscope (×50). FIG. 3 is an image obtained by photographing the result thereof with the optical microscope image.

The number of the corrosion points generated for 3 days from Day 3 image observed in FIG. 3 was counted and described in Table 2 below.

TABLE 2

|  | Classification ||
| --- | --- | --- |
|  | Example 1 | Comparative Example 1 |
| Number of corrosion point | 100 or more | 5 or less |

From the result above, in Example 1, it was confirmed that the moisture resistance was further improved compared to Comparative Example 1.

Experimental Example 3: Evaluation of Abrasion Resistance

Figure 4:
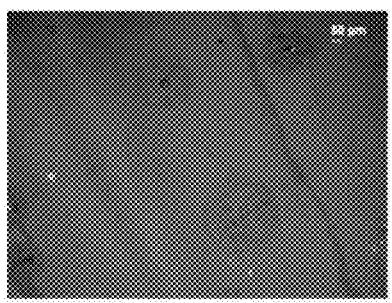
FIG. 4 is an optical microscope image under a specific condition for the abrasion resistance evaluation with regard to the functional building material for windows and doors manufactured in Example and Comparative Example.

An abrasion resistance test was performed by using a washer (MANNA, MGR-460) with regard to the functional building material for windows and doors manufactured according to Example 1 and Comparative Example 1, and accordingly, whether a scratch is generated on the surface of each low emissivity coating was observed with the naked eyes, and the degree that the scratch is generated on the surface of each low emissivity coating is compared to evaluate a mechanical durability. FIG. 4 is an image obtained by photographing the result thereof by the optical microscope image.

The scratch form observed in the image of FIG. 4 was explained in Table 3.

TABLE 3

|  | Classification ||
| --- | --- | --- |
|  | Example 1 | Comparative Example 1 |
| Scratch form | hairline scratch | area scratch |

As shown in Table 3 and FIG. 4, it was confirmed that Comparative Example 1 had a poor abrasion resistance as the scratch degree is severe. On the other hand, it was understood that Example 1 has the low degree of the scratch as the structural deformation of the low emissivity coating is generated less and it was confirmed that the abrasion resistance was excellent compared to Comparative Example 1.

Hereinabove, while the preferred Examples of the present invention are described in detail, the scope of right of the present invention is not limited thereto, and many variations and modifications by those skilled in the art by using a basic concept of the present invention which is defined in the following claims belong to the scope of right of the present invention.

SEQUENCE LIST TEXT

10: Low emissivity coating
100: Transparent glass substrate
110: Low emissivity coating
120: Lowermost barrier layer
130, 170: Dielectric layer
140, 160: Low emissivity protective layer
150: Low emissivity layer
180: Uppermost protective layer

The invention claimed is:

1. A functional building material for windows and doors, which is a multi-layered structure comprising:
 a transparent glass substrate; and
 a low emissivity coating formed on a surface of the transparent glass substrate,
 wherein the low emissivity coating includes a lowermost barrier layer, a dielectric layer, a low emissivity protective layer, a low emissivity layer, and an uppermost protective layer,
 wherein the lowermost barrier layer is located at the lowermost portion of the low emissivity coating to contact the transparent glass substrate, and the uppermost protective layer is located at the uppermost portion at which the low emissivity coating is outwardly exposed,
 wherein the lowermost barrier layer is multi-layered to include a first layer contacting the transparent glass substrate and a second layer located on the upper part of the first layer,
 wherein the first layer is a metal layer, and comprises a metal or a composite metal, and wherein the second layer includes one selected from the group consisting of a metal oxide, a metal nitride, a metal oxynitride, a composite metal oxide, a composite metal nitride, a composite metal oxynitride, and a combination thereof.

2. A functional building material for windows and doors according to claim 1, wherein the metal is Si, Zr or Ti, and the composite metal is SiAl, ZrSi or TiZr.

3. A functional building material for windows and doors according to claim 1, wherein the second layer comprises one selected from the group consisting of silicon oxide, silicon aluminum oxide, zirconium oxide, zirconium silicon oxide, titanium oxide, titanium zirconium oxide, silicon oxynitride, silicon aluminum oxynitride, zirconium oxynitride, zirconium silicon oxynitride, titanium oxynitride, titanium zirconium oxynitride, and a combination thereof.

4. A functional building material for windows and doors according to claim 1, wherein the lowermost barrier layer further comprises an additional metal layer, comprising:
   a metal of Si, Zr or Ti;
   a composite metal of SiAl, ZrSi or TiZr; or
   an additional metal compound layer comprising one selected from the group consisting of silicon oxide, silicon aluminum oxide, zirconium oxide, zirconium silicon oxide, titanium oxide, titanium zirconium oxide, silicon oxynitride, silicon aluminum oxynitride, zirconium oxynitride, zirconium silicon oxynitride, titanium oxynitride, titanium zirconium oxynitride, and a combination thereof,
   wherein the metal or the composite metal of the additional metal layer is same as, or different from, the metal or the composition metal of the first layer.

5. A functional building material for windows and doors according to claim 1, wherein the low emissivity protective layer is comprised of a single layer or a plurality of layers and is located on a surface or both surfaces of the low emissivity layer.

6. A functional building material for windows and doors according to claim 1, wherein the dielectric layer is comprised of a single layer or a plurality of layers.

7. A functional building material for windows and doors according to claim 1, wherein the dielectric layer is comprised of a plurality of layers and the low emissivity protective layer and the dielectric layer are sequentially formed on both surfaces of the low emissivity layer to form a symmetric structure.

8. A functional building material for windows and doors according to claim 1, wherein the low emissivity layer comprises at least one selected from the group consisting of Ag, Au, Cu, Al, Pt, ion doped metal oxide, and a combination thereof.

9. A functional building material for windows and doors according to claim 1, wherein the low emissivity layer has an emissivity ranging from 0.01 to 0.3.

10. A functional building material for windows and doors according to claim 1, wherein the low emissivity protective layer has an extinction coefficient in a visible light region of 1.5 to 3.5.

11. A functional building material for windows and doors according to claim 1, wherein the low emissivity protective layer comprises one selected from the group consisting of Ni, Cr, alloy of Ni and Cr, and a combination thereof.

12. A functional building material for windows and doors according to claim 1, wherein the dielectric layer comprises at least one selected from the group consisting of a metal oxide, a metal nitride, and a combination thereof, or comprises a material of the at least one doped with at least one element selected from the group consisting of bismuth (Bi), boron (B), aluminum (Al), silicon (Si), magnesium (Mg), antimony (Sb), beryllium (Be), and a combination thereof.

13. A functional building material for windows and doors according to claim 1, wherein the dielectric layer comprises at least one selected from the group consisting of titanium oxide, tin zinc oxide, zinc oxide, zinc aluminum oxide, tin oxide, bismuth oxide, silicon nitride, silicon aluminum nitride, silicon tin nitride, and a combination thereof.

14. A functional building material for windows and doors according to claim 1, wherein the transparent glass substrate is a glass or a transparent plastic substrate having a visible light transmittance of 80% to 100%.

* * * * *